United States Patent [19]

Diethelm et al.

[11] 4,026,864

[45] May 31, 1977

[54] PROCESS FOR THE MANUFACTURE OF AMINOPLAST AND PHENOPLAST MOULDING COMPOSITIONS USING A FLUIDIZED BED DRIER

[75] Inventors: Hermann Diethelm, Aesch; Peter Ruf, Binningen; Willi Zummerli, Ollon, all of Switzerland

[73] Assignee: Ciba-Geigy Corporation, Ardsley, N.Y.

[22] Filed: Nov. 5, 1974

[21] Appl. No.: 521,105

[30] Foreign Application Priority Data

Nov. 5, 1973 Switzerland ............... 15559/73

[52] U.S. Cl. .................... 260/38; 260/39 R; 427/213; 427/221
[51] Int. Cl.² ................................. C08J 3/12
[58] Field of Search .......... 260/39 R, DIG. 40, 38, 260/39; 427/213, 221; 264/DIG. 51

[56] References Cited

UNITED STATES PATENTS

| | | | |
|---|---|---|---|
| 2,101,635 | 12/1937 | Bender | 260/38 X |
| 3,036,932 | 5/1962 | Masarzuppi et al. | 264/DIG. 51 |
| 3,376,239 | 4/1968 | Pfeiffer | 260/39 R X |
| 3,775,240 | 8/1973 | Lucker et al. | 260/DIG. 40 |
| 3,786,041 | 1/1974 | Talsma | 260/39 R X |
| 3,793,302 | 2/1974 | Berstein et al. | 260/39 R X |
| 3,856,441 | 12/1974 | Suzukawa et al. | 264/DIG. 51 |
| 3,880,968 | 4/1975 | Kaspar et al. | 264/37 |

*Primary Examiner*—Sandra M. Person
*Attorney, Agent, or Firm*—Luther A. R. Hall

[57] ABSTRACT

Aminoplast or phenoplast moulding compositions are manufactured by passing an aqueous solution of a urea-formaldehyde resin, of an optionally phenol-modified melamine-formaldehyde resin or of a phenol-formaldehyde resin into a fluidized bed drier, by spraying the resin onto fillers and drying it. The compositions are used for crockery, household articles and technical components for the electrical industry.

7 Claims, No Drawings

PROCESS FOR THE MANUFACTURE OF AMINOPLAST AND PHENOPLAST MOULDING COMPOSITIONS USING A FLUIDIZED BED DRIER

Urea, melamine, phenolic and phenol-modified melamine moulding compositions have been marketed for a considerable time and have, because of their good properties, gained a considerable share of the market. They are used for the manufacture of crockery, household articles and technical components for the electrical industry. They have good mechanical and electrical properties coupled with excellent surface hardness and resistance to liquids customarily found in households, against foodstuffs, against acids and against alkaline media.

There are numerous processes for the manufacture of these moulding compositions.

All the processes are preceded by the batchwise or continuous manufacture of the resin, in which, depending on the nature of the moulding composition, urea, melamine or phenol or phenol-modified (melamine-phenol) is condensed with formaldehyde in a stirred kettle until the desired resin is produced.

The resin thus manufactured can now be evaporated to dryness and can be mixed with the additives only at this stage (dry process) or can, as is also customary, be kneaded direct, as an aqueous solution, with the cellulose and additives and only then be dried in a third stage (wet process).

The premixes thus manufactured still require to be homogenised and pigmented, and this is carried out in comminuting homogenising equipment or in ball mills. After this procedure, the product is in principle already the finished moulding composition, but in the form of a dust. It is known that products in the form of a dust tend to bridging and for this reason do not ensure continuous feed in automatic processes. Therefore, the moulding compositions obtained in the form of a dust are additionally densified and this can be carried out cold or warm depending on the type in question. Tabletting presses or roller densifiers are suitable for use for cold densification. In recent times, hot densifiers appear to be gaining increasing acceptance. The products are fed into heated extruder screws where, following the homogenisation and compacting process, the moulding compositions obtained are granulated whilst still hot and without producing dust. If necessary, this stage is followed by a fractionation or dust-removing process.

The wet process offers the advantage that an intimate mixture with cellulose can be achieved. In the dry process, this premix is less good, but the products can be manufactured more cheaply and can be processed better.

These know processes suffer from the disadvantage that because of the long times for which the product is exposed to higher temperatures, for example in the drier or kneader, the degree of condensation varies and is no longer sufficiently reproducible in the light of the high standards which are nowadays demanded of the processing of moulding compositions, and of the cured products.

A process described in German Offenlegungsschrift No. 2,163,506 seeks to remedy this shortcoming by passing the pulverulent mixture of the starting materials, namely resin, fillers and optionally further additives, continuously and in a constant thickness of layer through a heating zone, in the course of which the desired degree of condensation is arrived at. As a result, the entire process has one more working stage and is correspondingly more expensive. The danger of soiling of the products, especially products of light colour, increases with each additional stage.

The process according to the invention overcomes these disadvantages. It is characterised in that an aqueous solution of a resin consisting of a reaction product of formaldehyde with urea, melamine, phenol or phenol-modified melamine is passed, optionally after addition of pigments, into a fluidised bed drier, there sprayed onto fillers and dried at a temperature at which the resin does not fuse completely.

The product is obtained as granules which already have a high bulk density and, if the fluidised bed drier is of suitable construction, such as, for example, described in German Offenlegungsschrift No. 2,231,445, are of uniform particle size, so that the products can be employed direct as a moulding composition. Appropriately, however, it is subjected to a warm densification in an extruder, prior to further processing. Because of its higher bulk density, it is drawn into the extruder substantially better than a powder mixture manufactured according to known processes.

In detail, the following procedure can be employed in carrying out the process according to the invention:

The condensation of the phenol, urea, melamine or melamine-phenol with formaldehyde is carried out in a condensation kettle in the usual manner, in aqueous solution in the presence of catalysts, such as acids or bases. The desired precondensates are obtained by controlling the ratios of the materials, the reaction temperature, which is usually between 70° and 90° C, and the time, which is usually a few hours. Condensates which have a water compatibility of 1.0:1.2 to 1.0:3.5 (ratio of resin to water at which the condensate will still give a solution free from turbidity at room temperature) are desired as a rule. Solutions which contain from 50 to 75% of resin and still give a clear solution are best suited to carrying out the process according to the invention. If more dilute solutions are produced, these should preferably be concentrated to the optimum concentration before they are fed to the fluidised bed drier. Pigments and/or minerals can also already be mixed into the resin syrup.

The resin syrup is now pumped continuously into the fluidised bed drier and sprayed onto the fillers suspended in the fluidised bed. Fillers which can be used are cellulose powder, wood flour and mineral powders, for example asbestos flour, glass powder, kaolin, barium sulphate, calcium carbonate and magnesium oxide, optionally mixed with pigments such as lithopone, $TiO_2$, organic coloured pigments and lubricants such as magnesium stearate or zinc stearate, and waxes. These are also fed into the drier continuously. The fine distribution of the resin solution permits uniform spraying of the filler particles. The air temperature and the residence time are so chosen that the product drawn off continuously has the desired particle size and a constant residual moisture content of about 5% . The higher is the chosen temperature of the input air, the higher the drier output becomes. However, the fluidised bed temperature must always be below the softening point of the resin. By skillfully controlling the flow of air it is possible to use input air which is at temperatures above the softening point of the resin, without the material sticking together. To achieve the desired particle size of the dried particles, a part of the contents of the fluidised bed is recycled through the drier and the desired particle fraction is withdrawn. The procedure is described in German Offenlegungsschrift No. 2,231,445.

The granules, thus produced and fractionated, from the fluidised bed drier in most cases substantially meet the requirements of the finished moulding composition and can frequently be used direct for the manufacture of mouldings. In any case the granules have the advantage — in contrast to the products obtained with other conventional processes, especially in warm densification, which starts from a powder mixture of resin and cellulose — that they already have a higher bulk density, such as 0.5 kg/liter, for which reason they are drawn into extruders substantially better, and give better throughputs, than do powders where tamping devices have to be used.

As a result of the improved throughput in warm densification apparatuses, which results in a lower residence time in the heated zone, it is also possible to produce, without difficulties, sensitive moulding compositions, especially very rapid curing moulding compositions.

Warm densification apparatuses which can be used are, above all, single-screw extruders or twin-screw extruders. The heat required for the melting process is in most cases generated by friction.

The lumps obtained after the warm densification can be passed into an extruder, briefly plasticised and granulated by passing through a perforated die with face cutter. Such granules are used, above all, as injection moulding compositions. The warm densified product can also be cooled, crushed and ground, after which it can be used as a compression moulding composition.

The moulding compositions thus obtained give mouldings which are very resistant to crack formation and which in particular also show no cracks around the position of the sprue even after annealing. The mouldings are largely free from strains and distortion. The manufacturing process can be carried out in one pass and is shorter and more economical than the known processes. It ensures very good reproducibility of the moulding compositions. The uniform degree of condensation of the resins, which is of importance in adjusting the flow of the material, can be retained to the desired degree in the finished moulding composition.

It is surprising that the process according to the invention can be carried out in such a trouble-free and economical manner. Rather, it might have been expected that as a result of the plastic particles sticking together, and sticking to the walls of the drier, difficulties would arise and that as a result of the relatively small temperature difference in the fluidised bed between the input air temperature and the bed temperature, only low throughputs, with high expenditure of energy, would be possible.

All the stages, especially the fluidised bed drying, are distinguished, compared to conventional processes, by the fact that they handle the sensitive resin extremely gently and that the resin therefore only undergoes very slight and controllable further condensations of good reproducibility. The degree of condensation of the finished moulding composition can be kept constant with a hitherto unattainable precision and can be determined by the degree of condensation of the original resin solution without having to introduce an additional special process step for this purpose.

The process is particularly suitable for relatively high-melting resins, that is to say for urea-formaldehyde resins and especially for melamine-formaldehyde resins, as well as melamine-phenol-formaldehyde resins. The residence time in the fluidised bed drier is preferably about 1 hour and the temperature is between about 50° C and the melting point of the resin.

EXAMPLE 1 a. In a stirred kettle, 1.39 tons of 36.5 percent strength by weight (= 40 percent strength by volume) aqueous formaldehyde solution are adjusted to a pH value of 9.2 with sodium hydroxide solution and diluted with water, and 1.33 tons of melamine are added at 70° C. The condensation is carried out at 90° C and is followed by determining the compatibility of the solution with water. When a degree of condensation with a compatibility with water of 1:3.5 (resin to water) is reached, the solution is cooled to room temperature.

b. The resin solution pre-condensed in this way is pumped continuously into the bed of the fluidised bed drier of 0.8 m² sieve area. A temperature of approx. 55° C is maintained in the drier by means of a stream of hot air of 1,600 Nm³/hour. At the same time, 68 kg/hour of a mixture of 288 kg of barium sulphate, 694 kg of cellulose powder, 1 kg of Pigment Blue 15 (C.I. 74,160) and 14 kg of zinc stearate as a lubricant are introduced continuously into the drier. The resulting granules, having a residual moisture content of 4 – 8% by weight (measured by drying for 4 hours at 105° C) have a bulk density of 300 – 600 g/liter and a particle size of 0.05 – 2 mm. They are distinguished by excellent free-flowing characteristics and do not cake together even on storage for months.

c. The granules from the fluidised bed drier are fed continuously into a twin-screw extruder, plasticised and homogenised. The lumps are extruded through a perforated die by means of a subsequent extruder, and the extrudate is cut by means of the face cutter into particles of about 4 mm diameter and the same length. The warm-densified moulding composition thus obtained is outstandingly suitable for processing by the injection moulding method and when using a pin gate gives strain-free and crack-resistant mouldings.

EXAMPLE 2 a. 40 kg of 37% strength aqueous formaldehyde solution, 39 kg of 80% strength phenol, 250 kg of melamine and 1.3 liters of 30% strength sodium hydroxide solution are warmed to 95° C in a stirred kettle equipped with an anchor stirrer. Condensation of the solution is continued at this temperature until the desired degree of condensation (compare Example 1) is reached; thereafter the solution is cooled rapidly.

b. The resin solution obtained is pumped continuously, at a throughput of 50 kg/hour, into the bed of a fluidised bed drier of 0.8 m² sieve area. In this drier, a fluidised bed temperature of 50 ° – 52° C is maintained by means of a stream of fresh air, of 1,600 Nm³/hour, at 97° C. At the same time, a mixture of 80% of cellulose powder and 20% of lithopone, premixed with 0.2% of zinc stearate, (based on the moulding composition) is metered into the drier at a throughput of 15 kg/hour. The resulting granules have a residual moisture content of 4 – 7% and possess excellent free-flowing properties and stability on storage.

c. The granules are plasticised continuously in an extruder and are granulated hot by means of a perforated die and face cutter. The resulting dust-free composition, in the form of regular particles of about 4 mm size, is above all very suitable for processing by injection moulding. Strain-free mouldings of excellent resistance to cracking can be manufactured even with a pin gate.

EXAMPLE 3 a. 4 kg of magnesium carbonate and 246 liters of concentrated ammonia solution are added to 2,710 kg of a 36.5% strength by weight aqueous solution of formaldehyde (40 percent strength by volume) in a stirred kettle of 4,000 liters capacity. 1,280 kg of urea are added whilst warming the mixture to 46° C. The exothermic reaction is then so controlled by cooling, that the maximum temperature does not exceed 55° C. After reaching the desired degree of condensation (compare Example 1), the mixture is cooled to 30° – 35° C. The resulting UF resin solution is stable for several days.

b. The UF resin solution is pumped continuously, at a throughput of 130 kg/hour, into the bed of a fluidised bed drier with a sieve area of 0.8 m$^2$. The bed temperature is kept at 50° C by means of a stream of hot air of 1,600 Nm$^3$/hour. At the same time, 30 kg/hour of cellulose powder — premixed with a little zinc oxide, zinc stearate, lithopone and Pigment Blue 15 — are metered continuously into the drier. Granules of 4 – 6% by weight residual moisture content are produced, which are distinguished by excellent free-flowing characteristics.

c. The granules are warm-densified continuously in an extruder, and granulated hot using a perforated die and face cutter. A dust-free UF moulding composition in the form of very regular particles of 4 mm diameter is produced. This composition gives good strain-free and crack-resistant mouldings and is particularly suitable for processing by injection moulding.

What we claim is:

1. A process for the manufacture of aminoplast or phenoplast moulding compositions, characterised in that an aqueous solution of a urea-formaldehyde resin, of a melamine-formaldehyde resin, or a phenol-modified melamine-formaldehyde resin or of a phenol-formaldehyde resin is passed, optionally after addition of pigments, into a fluidised bed drier, there sprayed onto fillers and dried at a temperature at which the resin does not fuse completely.

2. A process according to claim 1, characterised in that the dried product is granulated and is used direct as a moulding composition.

3. A process according to claim 1, characterised in that the dried resin-filler mixture is densified warm.

4. A process according to claim 1, characterised in that the aqueous resin solution contains 50 – 75% of resin.

5. A process according to claim 4, characterised in that the temperature in the fluidised bed is chosen to be between 50° C and the melting point of the resin and the residence time of the resin in the drier is about 1 hour.

6. A process according to claim 1, characterised in that an aqueous solution of a melamine-formaldehyde resin is used.

7. A process according to claim 1, characterised in that an aqueous solution of a phenol-modified melamine-formaldehyde resin is used.

* * * * *